United States Patent [19]

Hayashi et al.

[11] Patent Number: 4,830,920

[45] Date of Patent: May 16, 1989

[54] FLUORINE-CONTAINING ELASTOMER AND A SHAPED ARTICLE THEREOF

[75] Inventors: Kenichi Hayashi; Yoshito Matsuoka, both of Nobeoka; Michio Kasahara; Naoki Morita, both of Kawasaki, all of Japan

[73] Assignee: Asahi Kasei Kogyo Kabushiki Kaisha, Osaka, Japan

[21] Appl. No.: 85,760

[22] Filed: Aug. 17, 1987

[51] Int. Cl.$^4$ .................. B32B 27/32; C08F 214/22; C08F 214/26; C08F 214/28
[52] U.S. Cl. .................................... 428/421; 428/422; 526/254; 526/255
[58] Field of Search ................ 428/422, 421; 526/254, 526/255

[56] References Cited

U.S. PATENT DOCUMENTS

| | | | |
|---|---|---|---|
| 2,968,649 | 1/1961 | Pailthorp et al. | 526/254 |
| 3,801,552 | 4/1974 | Kometani et al. | 526/254 |
| 4,123,603 | 10/1978 | Stewart, Jr. | 526/254 |
| 4,720,405 | 1/1988 | Carson et al. | 428/422 X |

FOREIGN PATENT DOCUMENTS 0186180  7/1986  European Pat. Off. ............ 526/254

Primary Examiner—Thomas J. Herbert
Attorney, Agent, or Firm—Birch, Stewart, Kolasch & Birch

[57] ABSTRACT

The fluorine-containing elastomer of the present invention is a novel elastomer comprising vinylidene fluoride units and, hexafluoropropylene units, optionally with tetrafluoroethylene units, and wherein the fluorine content of the elastomer is 63.5 to 71% by weight, the content of fractions having molecular weights of 50,000 or less ($M_5$) in the elastomer is 5% by weight or less, the content of fractions having molecular weights of 1,000,000 or more ($M_{100}$) in the elastomer is 10 to 35% by weight, and the limiting viscosity number (ml/g) of the elastomer is in the range of from 100 to less than 250. The fluorine-containing elaastomer of the present invention is excellent in resistance to heat and chemicals and is not only extremely excellent in compression set resistance properties and mechanical properties but also has a satisfactory workability. Further, by vulcanization of the elastomer, there can be provided excellent shaped articles such as rings, gaskets, seals, diaphragms and the like.

14 Claims, No Drawings

FLUORINE-CONTAINING ELASTOMER AND A SHAPED ARTICLE THEREOF

FIELD OF THE INVENTION

The present invention relates to a novel fluorine-containing elastomer having a specific molecular weight distribution and a shaped article thereof. More particularly, the present invention is concerned with a fluorine-containing elastomer which has a relatively large limiting viscosity number, an extremely low content of low molecular weight components and a specific content of high molecular weight components and which is not only extremely excellent in compression set resistant properties and mechanical properties but also has a workability superior to or comparable with conventional fluorine-containing elastomers, and a shaped article thereof.

DESCRIPTION OF THE PRIOR ART

Fluorine-containing elastomers are excellent in their resistance to heat and chemicals and, therefore, have been appreciated as sealant materials to be employed under stringent conditions, such as O-rings, oil seals, packings, gaskets, diaphragm materials and the like.

With respect to sealant materials which are manufactured mainly by compression molding, it is important for these materials to have a small compression set. On the other hand, according to the recent technological innovation, the conditions under which sealant materials are used are increasingly stringent and, accordingly, the resistance of sealant materials to chemicals and solvents are becoming more and more important. However, if the fluorine content of a fluorine-containing elastomer is increased in order to improve the resistance of the elastomer to chemicals and solvents, there is raised a new problem that not only the compression set of the elastomer is increased but also the roll workability of the elastomer is lowered.

Heretofore, there have been proposed various compositions with respect to a fluorine-containing elastomer. For example, there have been proposed a method for producing a copolymer by polymerizing 60 to 15% by weight of vinylidene fluoride (hereinafter referred to as "VdF") units with 40 to 85% by weight of hexafluoropropylene (hereinafter referred to a "HFP") units (see Japanese Patent Application Publication No. 33-7394); a copolymer containing 3 to 35% by weight of tetrafluoroethylene (hereinafter referred to as "TFE") units and wherein the total amount of VdF units and HFP units is 97 to 65% by weight and the weight ratio of VdF units to HFP units is in the range of 2.33:1 to 0.667:1 (see Japanese Patent Application Publication No. 36-3495); a copolymer containing 10 to 30% by weight of TFE units and wherein the total amount of VdF units and HFP units is 90 to 70% by weight and the weight ratio of VdF units to HFP units is in the range of 1.6:1.0 to 4.0:1.0 (see Japanese Patent Application Publication No. 48-18957); and a copolymer comprising 57 to 61% by weight of VdF units, 27 to 31% by weight of HFP units and 10 to 14% by weight of TFE units (see Japanese Patent Application Laid-Open Specification No. 53-149291). On the other hand, various proposals have been made concerning the adjustment of the molecular weight distribution of a fluorine-containing elastomer. For example, there have been proposed a method for producing a copolymer having a bimodal molecular weight distribution comprising a two-stage polymerization process (continuous polymerization), wherein polymerization is initially effected for a high molecular weight copolymer and then for a low molecular weight copolymer (see Japanese Patent Application Publication No. 51-25279); a method for producing a copolymer or terpolymer having a low Mooney viscosity and excellent workability by suspension polymerization (see Japanese Patent Application Publication Nos. 49-29630 and 51-8432); and a fluorine-containing elastomer having a bimodal molecular weight distribution and a high molecular weight (see European Patent Application Publication No. 0186180A2). However, from the viewpoint of having, in combination, desired properties which include excellent compression set resistant properties and excellent workability, these proposals are still insufficient.

In general, if the content of low molecular weight components in a fluorine containing elastomer is increased, the workability is improved but the mechanical properties including compression set resistant properties are lowered, whereas if the content of high molecular weight components is increased, the mechanical properties including compression set resistant properties are improved but the workability is lowered. Thus, there has been a technical dilemma that a fluorine-containing elastomer cannot be simultaneously characterized by an excellent workability and excellent mechanical properties including compression set resistant properties. Therefore, it has been desired to solve the dilemma and develop a fluorine-containing elastomer having both excellent compression set resistant properties and an excellent workability.

DISCLOSURE OF THE PRESENT INVENTION

An object of the present invention is to provide a fluorine-containing elastomer having excellent properties which can be used under stringent conditions, that is, a fluorine-containing elastomer which is not only excellent in compression set resistant properties and resistance to chemicals and solvents but also has a workability superior to or comparable with conventional fluorine-containing elastomers.

The present inventors have made an extensive and intensive research and, as a result, found that a fluorine-containing elastomer can be improved with respect to its compression set resistant properties and workability by controlling the content of low molecular weight components to a specific level and lowering the content of high molecular weight components to a level as low as possible. Based on these findings, the present invention has been completed.

According to the present invention, there is provided a fluorine-containing elastomer comprising vinylidene fluoride units, hexafluoropropylene units and 35 to 0% by weight, based on the elastomer, of tetrafluoroethylene units, the total of said vinylidene fluoride units and said hexafluoropropylene units being 65 to 100% by weight based on the weight of the elastomer, the weight ratio of said vinylidene fluoride units to said hexafluoropropylene units being in the range of 80:20 to 40:60, and wherein:
  (a) the fluorine content of the elastomer is 63.5 to 71% by weight,
  (b) the limiting viscosity number (ml/g) of the elastomer is in the range of from 100 to less than 250, (c) the content of fractions having molecular weights of 50,000 or less in the elastomer is 5% by weight or less, and (d) the content of fractions having molecular weights of 1,000,000 or more in the elastomer is 10 to 35% by weight.

The fluorine-containing elastomer of the present invention includes a copolymer comprising VdF units and HFP units and a terpolymer further comprisin TFE units.

The most prominent characteristic feature of the fluorine-containing elastomer of the present invention resides in that it has a specific molecular weight distribution. As explained above, in general, if the content of low molecular weight components in a fluorine-containing elastomer is increased, the workability becomes improved but the mechanical properties including compression set resistant properties are lowered, whereas if the content of high molecular weight components is increased, the mechanical properties including compression set resistant properties are improved but the workability is lowered. Thus there has been a technical dilemma that a fluorine-containing elastomer cnnnot be simultaneously characterized by an excellent workability and excellent mechanical properties including compression set resistant properties. However, according to the present invention, it has unexpectedly been found that by controlling particularly the amount of fractions having molecular weights of 50,000 or less (hereinafter often referred to as "$M_5$") and the amount of fractions having molecular weights of 1,000,000 or more (hereinafter often referred to as "$M_{100}$") to specific ranges, a fluorine-containing elastomer can be improved with respect to its workability and mechanical properties including compression set resistant properties. Thus, the long-standing difficulties due to the above-mentioned technical dilemma have been completely obviated.

In the present invention, $M_5$ is 5% by weight or less and $M_{100}$ is 10 to 35% by weight based on the elastomer. The smaller the $M_5$, the more excellent the compression set resistant properties and, hence, there is no particular lower limit with respect to $M_5$. However, from the viewpoint of ease in manufacturing, the lower limit is preferably 0.4% by weight. Therefore, from the viewpoints of the desired properties of the elastomer and ease in manufacturing, $M_5$ is in the range of 0.4 to 5% by weight, preferably in the range of 0.8 to 3% by weight based on the weight of the elastomer.

In the present invention, $M_{100}$ is 10 to 35% by weight, preferably 10 to 30% by weight based on the elastomer. $M_{100}$ exceeding 35% by weight is not desirable because the roll workability of the elastomer is lowered. $M_{100}$ less than 10% by weight is also not desirable because there cannot be obtained a well-balanced combination of workability and mechanical properties including compression set resistant properties of the elastomer.

The fluorine content of the fluorine-containing elastomer of the present invention is 63.5 to 71% by weight. As is described above, the fluorine-containing elastomer of the present invention includes a copolymer comprising VdF units and HFP units and a terpolymer further comprising TFE units. The fluorine content depends solely on the VdF unit content among these three types of monomeric components. That is, if the VdF unit content is increased, the fluorine content is decreased, while if the VdF units content is decreased, the fluorine content is increased. The fluorine content of 63.5% by weight corresponds to 75% by weight, based on the weight of the elastomer, of VdF units. If the VdF unit content is more than 75% by weight, the chemical resistance of the elastomer is lowered. On the other hand, the fluorine content of 71% by weight corresponds to 30% by weight, based on the weight of the elastomer, of VdF units. If the VdF unit content is less than 30% by weight, the fluorine-containing elastomer becomes resinous when it comprises a composition in which the TFE unit content is large, while when the HFP unit content is large, the rate of polymerization in producing the elastomer is lowered and, therefore, the desired fluorine-containing elastomer cannot be obtained. The fluorine content which provides for an elastomer having a desirable elasticity is 64.5 to 69.5% by weight.

Stated with respect to the proportions of the monomer units constituting the fluorine-containing elastomer of the present invention, the elastomer comprises vinylidene fluoride units, hexafluoropropylene units and 35 to 0% by weight, based on the elastomer, of tetrafluoroethylene units, wherein the total of the vinylidene fluoride units and the hexafluoropropylene units is 65 to 100% by weight based on the elastomer, and the weight ratio of the vinylidene fluoride units to the hexafluoropropylene units is in the range of 80:20 to 40:60.

With respect to the copolymer comprising VdF units and HFP units, the preferable range of the weight ratio of the VdF units to the HFP units is 75:25 to 40:60. If the VdF units content is more than 75% by weight, the elastomer becomes resinous, while if the VdF units content is lower than 40% by weight, polymerization becomes difficult. In either case the desired fluorine-containing elastomer cannot be obtained. More preferably, the VdF unit content is 70 to 50% by weight. Accordingly, the HFP unit content is preferably 25 to 60% by weight and more preferably 30 to 50% by weight.

With respect to the terpolymer, when the fluorine content is in the range of 63.5 to 71% by weight, the total weight of the VdF units and the HFP units is 65% by weight or more based on the elastomer, the TFE unit content is 35% by weight or less and the weight ratio of the VdF units to the HFP units is in the range of 80:20 to 50:50. If the TFE unit content is more than 35% by weight, the fluorine-containing elastomer becomes resinous, which is not desirable. The preferable range of the TFE unit content is 5 to 35% by weight. With a TFE unit content of 5% by weight or more, the polymerization reaction proceeds smoothly, which facilitates to impart the desired value of the limiting viscosity number to the resulting elastomer.

In terms of a limiting viscosity number (ml/g) (hereinafter referred to as "$[\eta]$") which is one of the measures of the molecular weight of a fluorine-containing elastomer, the fluorine-containing elastomer of the present invention has a value of $[\eta]$ in the range of from 100 to less than 250, preferably 120 to less than 250.

In the fluorine-containing elastomer of the present invention, from the viewpoint of workability, it is preferred that when $[\eta]$ is 100 to less than 160, $M_{100}$ be 10 to less than 20% by weight, when $[\eta]$ is 160 to less than 220, $M_{100}$ be 20 to less than 30% by weight, and when $[\eta]$ is 220 to less than 250, $M_{100}$ be 30 to 35% by weight.

The above-mentioned terpolymer is especially excellent with respect to the balance of compression set resistant properties, resistance to chemicals and solvents, and workability. In the terpolymer of the present invention, it is more preferred that the TFE unit content be 25 to 5% by weight. With respect to the weight ratio of VdF units and HFP units, it is more preferably 60:40 to 50:50 when $[\eta]$ is 100 to less than 160 and $M_{100}$ is 10 to less than 20% by weight based on the weight of the elastomer, 70:30 to 60:40 when $[\eta]$ is 160 to less than 220 and $M_{100}$ is 20 to less than 30% by weight, and 80:20 to 70:30 when $[\eta]$ is 220 to less than 250 and $M_{100}$ is 30 to 35% by weight.

As described thereinbefore, in the present invention it is essential for $M_5$ to be 5% by weight or less. Even the fluorine-containing elastomer having a relatively small value of $[\eta]$ within the range of $[\eta]$ described above and having a high fluorine content, is caused to have an unexpectedly small compression set, when the $M_5$ content is 5% by weight or less.

Moreover, in the fluorine-containing elastomer of the present invention it is more preferred that the ratio of the weight average molecular weight ($\overline{Mw}$) to the number average molecular weight ($\overline{Mn}$), that is, $\overline{Mw}/\overline{Mn}$ be in the range of 2 to 4. By controlling the $\overline{Mw}/\overline{Mn}$ at this range, the molecular weight distribution can be greatly narrowed, leading to further improvement of the desired properties.

Conventional fluorine-containing elastomers are generally produced by emulsion polymerization except in special cases suspension polymerization or solution polymerization is employed. However, the type of polymerization which is suited for producing the fluorine-containing elastomer of the present invention is suspension polymerization. With respect to reaction conditions for producing the fluorine-containing elastomer of the present invention, the following can be mentioned. The polymerization temperature is 50° C. or higher. As a catalyst, a hydrocarbon peroxydicarbonate such as diisopropyl peroxydicarbonate is employed, and the total amount of the catalyst is added at once. The polymerization reaction is conducted for a period of 7 to 18 hours. If the polymerization pressure is raised, the polymerization time can be shortened.

Hereinbelow, the suspension polymerization for producing the fluorine-containing elastomer of the present invention will be illustratively described. Into an aqueous medium is dispersed an inert organic solvent, in which a prescribed monomer mixture (starting monomer mixture) is dissolved. A suspension stabilizer and an oil-soluble catalyst are added thereto, followed by a mechanical stirring while maintaining the temperature at 50° to 60° C. Subsequently, added thereto is a fresh monomer mixture (additional monomer mixture) to maintain the polymerization pressure at a predetermined level within the range of 10 to 17 kg/cm²-G, and thereby advancing the reaction. The proportions of the monomer units in the resultant fluorine-containing elastomer depends on the relationship between the proportions of the starting monomers and those of the additional monomers.

The proportions of the starting monomers and those of the additional monomers can be determined by gas chromatography (G.C.), and the proportions of the monomer units in the fluorine-containing elastomer can be determined by dissolving the elastomer in acetone and subjecting the resultant solution to $^{19}$FNMR.

As the inert organic solvent used in the suspension polymerization, there may be employed an organic solvent which does not have a carbon-hydrogen linkage, such a linkage being prone to cause radical chain transfer. Of such solvents, 1,1,2-trichloro-1,2,2-trifluoroethane is preferred from the viewpoint of performance and cost. As a suspension stabilizer, methyl cellulose is preferred. As an oil-soluble catalyst, a dialkyl peroxydicarbonate such as diisopropyl peroxydicarbonate is preferred because of its high decomposition temperature.

Further, it should be noted that according to the present invention, the fluorine-containing elastomer of the present invention having the desired $[\eta]$ can be obtained by producing a fluorine-containing elastomer having a value of $[\eta]$ which is 10 to 100 larger than the desired value of $[\eta]$ and then subjecting it to extrusion. The types of extruders are not limited, and any customary extruder may be employed for the purpose insofar as it is of a heated type and is capable of exerting shearing stress. This method will be described hereinunder by taking as an example the case where a twin extruder is used. When the present fluorine-containing elastomer is extruded by means of a twin extruder having 1 to 2 seal rings at a barrel temperature of 140° to 280° C., a revolution number of screws of 120 to 400 rpm and an extrusion rate of 20 to 50 kg/Hr, the temperature of the fluorine-containing elastomer becomes 280° to 350° C. $[\eta]$ of the fluorine-containing elastomer thus extruded decreases, and $M_{100}$ decreases but substantially no increase is observed with respect to $M_5$. As a result, surprisingly, the workability of the elastomer is improved but the properties of a vulcanizate made from the elastomer undergo substantially no change. In order to control $M_5$ to 5% by weight or less, it is preferred to extrude a fluorine-containing elastomer having a value of $[\eta]$ which is 10 to 100 larger than the desired $[\eta]$ by means of an extruder. If $[\eta]$ of the elastomer to be extruded is more than 100 $[\eta]$ larger than the desired $[\eta]$, the elastomer will disadvantageously be discolored. Some results of extrusions are shown in Table 1.

TABLE 1

| | | Sample A[1] (F content 68.7 wt %) | | Sample B[2] (F content 67.3 wt %) | |
| --- | --- | --- | --- | --- | --- |
| | | before extrusion | after extrusion | before extrusion | after extrusion |
| Properties of unvulcanized elastomer | $[\eta]$ | 177 | 157 | 267 | 206 |
| | $M_5$ | 1.1 | 1.5 | 0.8 | 1.2 |
| | $M_{100}$ | 36.0 | 22.2 | 44.1 | 30.0 |
| | $\overline{Mw}/\overline{Mn}$ | 3.0 | 2.4 | 2.7 | 2.3 |
| | roll-knitting number[3] | 204 | 17 | 322 | 18 |
| Properties of vulcanized elastomer | hardness (JIS-A) | 79 | 79 | 78 | 78 |
| | tensile stress at 100% elongation (kgf/cm²) | 48 | 46 | 61 | 56 |
| | tensile strength (kgf/cm²) | 177 | 170 | 199 | 185 |
| | elongation (%) | 300 | 300 | 255 | 255 |
| | compression set (%) (200° C., 72 Hr) | 20 | 20 | 17 | 16 |

Note:
(1) composition of sample A: VdF/HFP/TFE=43.8/33.1/23.1 wt %
(2) composition of sample B: VdF/HFP/TFE=52.4/27.8/19.8 wt %
(3) The roll-knitting number was determined as follows. 6-Inch rolls were employed (the speed ratio of the front roll to the back roll 1:1.14), the roll temperature was maintained at 30°±2° C., and the roll nip was adjusted at 0.8 mm. The fluorine-containing elastomer was subjected to tailing by introducing it between the rolls, 50 g at a time at 5-second intervals. The total number of revolution of the roll at which the introduced fluorine-containing elastomer began to stick to the roll in a uniform semitransparent sheet form was taken as the "roll-knitting number".

The fluorine-containing elastomer of the present invention can be vulcanized by means of a polyamine compound, polyol compound or the like, and vulcanization thereof by means of a polyol compound particularly allows the fluorine-containing elastomer to remarkably exert its improved properties. Hereinbelow, the vulcanization method using a polyol compound is described.

To the fluorine-containing elastomer are added an acid binder, a polyol compound, a vulcanization accelerator and, according to need, a filler, followed by kneading. Subsequently, the keaded mixture is heated to effect vulcanization.

As an acid binder, there may be mentioned an oxide or hydroxide of ambivalent metal such as an oxide or hydroxide of magnesium, calcium, zinc or lead. The amount of the binder to be used is in the range of 1 to 30 parts by weight, preferably 2 to 20 parts by weight per 100 parts by weight of the elastomer.

As a polyol compound, there may be mentioned hydroquinone, 2,2-bis(4-hydroxyphenyl)propane(bisphenol A), 2,2-bis(4-hydroxyphenyl)perfluoropropane(-bisphenol AF), 4,4'-dihydroxydiphenylmethane, and 2,2-bis(4-hydroxyphenyl)butane. The amount of the polyol compound to be used is 0.1 to 10 parts by weight, preferably 0.6 to 5 parts by weight per 100 parts by weight of the elastomer.

As a vulcanization accelerator, there may be mentioned a quaternary onium salt, a quaternary phosphonium salt, a quaternary ammonium salt and iminium salt, such as tetramethylammonium chloride, tetraethylammonium chloride, tetrapropylammonium chloride, tetrabutylammonium chloride, tetrabutylammonium bromide, bis(benzyldiphenylphosphine) iminium chloride, tetrabutylphosphonium chloride, benzyltrihhenylphosphonium chloride and benzyltrioctylphosphonium chloride. The amount of the vulcanization accelerator is 0.05 to 2 parts by weight, preferably 0.1 to 1 part by weight per 100 parts by weight of the elastomer. As a filler or reinforcing agent, carbon black, silica, clay, talc or the like may be employed depending on the use.

A mixture of the fluorine-containing elastomer, a ployol compound, a vulcanization accelerator and a filler is kneaded by means of rolls or a Banbury mixer, and subjected to a primary vulcanization in a metal mold under pressure and then to a secondary vulcanization. Generally, the primary vulcanization is effected at 100° to 200° C. for 10 to 180 min under 20 to 100 kg/cm²-G and the secondary vulcanization is effected at 150° to 300° C. for several minutes to 30 hours. Optionally, the secondary vulcanization may be omitted.

Through the vulcanization, there can be obtained a heat-fixing roll, a control valve, a diaphragm, shaped packings such as O-ring, V-packing, U-packing, Y-packing, D-ring, triangular ring, T-ring and X-ring, a gasket, a rubber valve seat type butterfly valve, a stem valve, an oil seal, a shaped article for use with SF class engine oil, a fuel hose, a heat-shrinkable tubing, a wet friction material, a wire coating, a piezoelectric material, bellows for smoke duct joint.

In the use of the elastomer as a diaphragm, an elongation is required rather than a compression set resistance and, therefore, vulcanization by means of a polyamine compound is also effective in molding the fluorine-containing elastomer of the present invention. The above-mentioned conditions for vulcanization by means of a polyol compound may apply to this vulcanization by means of a polyamine compound. In effecting the vulcanization by means of a polyamine compound, the following formulation may be employed.

The formulation may comprise 100 parts by weight of the elastomer, 0.3 to 5 parts by weight, preferably 0.5 to 4 parts by weight of a polyamine compound such as hexamethylenediamine carbamate and 1 to 30 parts by weight, preferably 5 to 20 parts by weight of an oxide of a bivalent metal.

With respect to the fluorine-containing elastomer of the present invention, the measuring conditions for the limiting viscosity number and the molecular weight distribution ($M_5$ and $M_{100}$), and the standard conditions for the vulcanization by means of a polyol compound are as follows.

(1) Limiting viscosity number

A 0.1 g/100 ml solution of the elastomer in methyl ethyl ketone is subjected to viscosity measurement using a capillary viscometer at 35° C.

(2) Molecular weight distribution

Liquid chromatography: LC-3A (manufactured by Shimadzu Corp., Japan)

Columns: KF-80M (two)+KF-800P (precolumn)- (manufactured by Showa Denko K.K., Japan)

Detector: ERC-7510S (manufactured by ELMA Optical Works, Ltd., Japan)

Integrator: 7000A (manufactured by System Instruments Co., Ltd., Japan)

Developer: tetrahydrofurane

Concentration: 0.1% by weight

Temperature: 35° C.

Standard polymer for molecular weight calibration: various monodisperse polystyrenes (manufactured by Toyo Soda Mfg Co., Ltd., Japan) ($\overline{M}w/\overline{M}n=1.2(max)$)

note: the $M_5$ and $M_{100}$ contents are calculated from the results of the above measurements.

(3) Standard conditions for the vulcanization by means of a polyol compound

Fluorine-containing elastomer: 100 parts by weight

Highly activated magnesium oxide: 3 parts by weight

Calcium hydroxide: 6 parts by weight

Bisphenol AF: 2 parts by weight

Bis(benzyldiphenylphosphine)iminium chloride: 0.3 parts by weight

Medium thermal carbon: 30 parts by weight

Means for kneading: rolls

Primary heat press vulcanization: 177° C., 10 min

Secondary oven vulcanization: 232° C., 24 hours

With respect to the measurement of the mechanical properties of the polyol-vulcanized elastomer, No. 3 dumbbell specimens blanked out from a 2 mm-thick sheet of vulcanized elastomer were subjected to measurement using a tensile machine (manufactured by Toyo Seiki Co., Ltd., Japan) at a pulling rate of 50 cm/min according to the method of JIS-K6301.

On the other hand, with respect to the measurement of the compression set, substantially in accordance with the method of JIS-K6301, polyol-vulcanized P-24 type O-rings were compressed so that the thickness thereof decreases by 25% and kept at 200° C. for 72 hours and then allowed to cool at room temperature for 30 min, followed by measurement using a thickness meter.

Further, the conditions for the abrasion resistance measurement was as follows.

Conditions for abrasion resistance measurement

Taber abrasion (ATTM D1044-56) was measured under the following conditions.
 Machine: Taber machine (manufactured by Toyo Tester Corporation, Japan)
 Truck wheel: H-22
 Unit of wear: weight loss (mg)/1000 times (room temperature)

The fluorine-containing elastomer of the present invention has a low Mooney viscosity(Mooney Scorch) and an excellent workability, and it has also good mold release characteristics so that the mold hardly takes grime. The vulcanized elastomer has a low tensile stress at 100% elongation and a low hardness and, in addition to these so-called elastomeric properties, it has such an excellent property that it is low in compression set. The vulcanized elastomer has a compression set as remarkably low as 20 or less as tested at 200° C. for 72 hours, and also has a large tensile strength and does not become brittle even at low temperature. Further, the elastomer exhibits almost no mill shrinkage. Furthermore, since its Mooney viscosity $[ML_{1+10}(121°\ C.)]$ is in the range of 90 to 145, even if $[\eta]$ is increased, the excellent workability of the elastomer is maintained. Hence, in compression molding, the fluidity of the elastomer is properly controlled, thereby exhibiting less air entrapment and less burr.

PREFERRED EMBODIMENT OF THE INVENTION the pressure back to 13 kg/cm$^2$-G. Repeating this operation, the polymerization reaction is performed for 9 hours. After completion of the polymerization reaction, the remaining monomer mixture is discharged. The obtained suspension is subjected to centrifugation to remove water and, after thoroughly washed with water, subjected to vacuum drying at 100° C. to obtain about 8 kg of the desired elastomer. The obtained fluorine-containing elastomer is subjected to $^{19}$FNMR analysis to find that the elastomer consisted of 55.1% by weight of VdF units, 29.1% by weight of HFP units and 15.8% by weight of TFE units and that $[\eta]$ is 228.

The thus obtained fluorine-containing elastomer is subjected to extrusion under the below-described extrusion conditions using the below-described extruder. After cutting by a hot cutter, the elastomer is left to cool, thereby obtaining pellets of the elastomer.
 [Extruder]
 manufactured by the Japan Steel Works, Ltd., Japan
 Model: TEX44PS-30AW-2V (twin-screw)
 [Extrusion Conditions]
 Temperature 170° C.
 Revolution number of screws 300 rpm
 Sample supply rate 30 kg/hr With respect to the pelletized fluorine-containing elastomer, $[\eta]$ is 169, $\overline{Mn}$ is $23.9 \times 10^4$, $\overline{Mw}/\overline{Mn}$ is 2.2, $M_5$ content is 2.0% by weight, $M_{100}$ content is 13.3% by weight, and the Mooney viscosity $[ML_{1+10}(121°\ C.)]$ is 102.

As a result of the polyol vulcanization of the pelletized fluorine-containing elastomer under the standard conditions, there is obtained a vulcanized product having extremely excellent mechanical properties. The mechanical properties of this vulcanized rubber are shown in Table 2.

TABLE 2

| Hardness (JIS-A) | Tensile stress at 100% elongation (Kgf/cm$^2$) | Tensile strength (Kgf/cm$^2$) | Elongation (%) | Compression set (%) |
|---|---|---|---|---|
| 76 | 52 | 183 | 240 | 16 |

The present invention will be described in more detail with reference to the Examples, which should not be construed to be limiting the scope of the present invention.

Example 1

The air in an autoclave having a capacity of about 15 liters which is provided with an electromagnetic stirrer is fully replaced by nitrogen gas, and an evacuation-N$_2$ filling cycle is repeated 3 times. Afterthe nitrogen replacement, under reduced pressure, the autoclave is charged with 5800 g of degassed purified water, 2670 g of 1,1,2-trichloro-1,2,2-trifluoroethane (hereinafter referred to as "Freon-113") and 2.9 g of methylcellulose (viscosity 50 cp), followed by stirring at 500 rpm while maintaining the temperature at 50° C. Subsequently, there is charged a monomer mixture as a charge gas which consisted of 26.4% by weight of VdF, 68.1% by weight of HFP, and 5.5% by weight of TFE until a pressure of 13 kg/cm$^2$-G is attained. Then, 51 g of a Freon-113 solution containing 10.5% by weight of diisopropyl peroxydicarbonate as a catalyst is introduced to start the polymerization. As the polymerization proceeded, the pressure decreased to 12.5 kg/cm$^2$-G. Then, there is added a monomer mixture consisting of 55.3% by weight of VdF, 28.3% by weight of HFP and 16.4% by weight of TFE as an additional gas, thereby to bring Example 2

The polymerization is effected in substantially the same manner as in Example 1 except that the polymerization conditions were as indicated in Table 5 at its column entitled "polymerization conditions", and the extrusion is conducted under the same conditions as in Example 1. Before the extrusion, $[\eta]$ is 143. In Table 5 are shown the results of the polymerization and the properties of the pelletized elastomer and the vulcanized rubber.

Example 3

In substantially the same manner as in Example 1, purified Freon-113 and a suspension stabilizer are charged into an autoclave, followed by stirring at 500 rpm while keeping the temperature at 50° C. Subsequently, there are introduced a monomer mixture consisting of 16.9% by weight of VdF and 83.1% by weight of HFP until the pressure became 15.0 kg/cm$^2$-G and then 51 g of a Freon-113 solution containing 10.5% by weight of diisopropyl peroxydicarbonate as a catalyst is introduced to start the polymerization. As the polymerization proceeded, the pressure decreased to 14.5 kg/cm$^2$-G. Then, there is added a mixed gas consisting of 51.7% by weight of VdF and 48.3% by weight of HFP as an additional monomer, thereby to bring the pressure back to 15 kg/cm$^2$-G. Repeating this operation, the polymerization reaction is performed for 15 hours to obtain about 5 kg of the desired elastomer. The elastomer consisted of 52.0% by weight of VdF units and 48.0% by weight of HFP units, and [η] is 151, $\overline{Mn}$ is 17.9×10$^4$, $\overline{Mw}/\overline{Mn}$ is 3.2, M$_5$ is 4.3%, M$_{100}$ is 19.6%, and Mooney viscosity [ML$_{1+10}$(121° C.)] is 133.

The thus obtained fluorine-containing elastomer is subjected to polyol vulcanization under the standard conditions. The properties of the obtained vulcanized rubber are shown in Table 3.

Example 6

The polymerization is performed in substantially the same manner as in Example 3 except that the polymerization conditions are as indiaated in Table 4 at its column entitled "polymerization conditions". The results of the polymerization, the properties of the elastomer, and the properties of the vulcanized rubber are shown in Table 4.

TABLE 4

| | Polymerization conditions | | | | | | | | Results of polymerization |
|---|---|---|---|---|---|---|---|---|---|
| | Compositon of starting monomer mixture | | | Composition of additional monomer mixture | | | Polymerization pressure (kg/cm$^2$-G) | Amount (1) of catalyst (g) | Polymerization time (hr) | Amount of obtained elastomer (Kg) |
| Example No. | VdF | HFP (wt %) | TFE | VdF | HFP (wt %) | TFE | | | | |
| 6 | 31.9 | 65.0 | 3.1 | 58.6 | 27.8 | 13.6 | 15.0 to 14.5 | 51 | 8 | 4 |

| | Results of polymerization Composition of elastomer | | | Properties of elastomer | | | | | Properties of vulcanized rubber | | | |
|---|---|---|---|---|---|---|---|---|---|---|---|---|
| Example No. | VdF | HFP (wt %) | TFE | [η] (ml/g) | ×10$^4$ $\overline{Mn}$ | $\overline{Mw}/\overline{Mn}$ | M$_5$ (%) | M$_{100}$ (%) | ML$_{1+10}$ (121° C.) | Hardness (JIS-A) | Tensile stress at 100% elongation (kgf/cm$^2$) | Tensile strength (kgf/cm$^2$) | Elongation (%) | Compression set (%) |
| 6 | 60.4 | 24.5 | 15.1 | 240 | 24.0 | 3.5 | 2.9 | 32.7 | 117 | 77 | 61 | 180 | 225 | 18 |

Note (1): in terms of weight (g) of a freon-113 solution containing 10.5% by weight of diisopropyl peroxydicarbonate

TABLE 5

| | Polymerization conditions | | | | | | | | | Results of polymerization |
|---|---|---|---|---|---|---|---|---|---|---|
| | Composition of starting monomer mixture | | | Composition of additional monomer mixture | | | Polymerization pressure (kg/cm$^2$-G) | Amount (1) of catalyst (g) | Polymerization time (hr) | Amount of obtained elastomer (kg) |
| Example No. | VdF | HFP (wt %) | TFE | VdF | HFP (wt %) | TFE | | | | |
| 2 | 5.4 | 90.6 | 4.0 | 39.4 | 38.8 | 21.8 | 15.0 to 14.5 | 51 | 11 | 6.5 |
| 4 | 21.2 | 78.8 | 0 | 56.5 | 43.5 | 0 | 15.0 to 14.5 | 51 | 10.3 | 3.3 |
| 5 | 23.6 | 69.4 | 7.0 | 47.0 | 30.0 | 23.0 | 10.0 to 9.5 | 38.3 | 18.5 | 7 |

| | Results of polymerization Composition of elastomer | | | Properties of elastomer (2) | | | | | | Properties of vulcanized rubber | | | | |
|---|---|---|---|---|---|---|---|---|---|---|---|---|---|---|
| Example No. | VdF | HFP (wt %) | TFE | [η] (ml/g) | ×10$^4$ $\overline{Mn}$ | $\overline{Mw}/\overline{Mn}$ | M$_5$ (%) | M$_{100}$ (%) | ML$_{1+10}$ (121° C.) | Hardness (JIS-A) | Tensile stress at 100% elongation (kgf/cm$^2$) | Tensile strength (kgf/cm$^2$) | Elongation (%) | Compression set (%) |
| 2 | 40.3 | 36.5 | 23.2 | 102 | 16.1 | 2.7 | 4.9 | 10.2 | 143 | 81 | 54 | 163 | 330 | 24 |
| 4 | 56.1 | 43.9 | 0 | 180 | 18.7 | 3.5 | 3.9 | 22 | 105 | 76 | 52 | 162 | 255 | 16 |
| 5 | 46.1 | 29.6 | 24.3 | 149 | 21.4 | 2.4 | 2.8 | 14.5 | 119 | 78 | 56 | 168 | 255 | 16 |

Note (1): in terms of weight (g) of a freon-113 solution containing 10.5% by weight of diisopropyl peroxydicarbonate
Note (2): properties of pelletized fluorine-containing elastomer after extrusion

TABLE 3

| Hardness (JIS-A) | Tensile stress at 100% elongation (Kgf/cm$^2$) | Tensile strength (Kgf/cm$^2$) | Elongation (%) | Compression set (%) |
|---|---|---|---|---|
| 78 | 47 | 154 | 265 | 16 |

Examples 4 and 5

Substantially the same procedures as in Example 1 are repeated except that the polymerization conditions are as indicated in Table 5 at its column entitled "polymerization conditions", and the extrusion is conducted under the same conditions as in Example 1. With respect to Examples 4 and 5, the values of [η] before extrusion are respectively 230 and 167. The results of the polymerization, the properties of the pelletized elastomer, and the properties of the vulcanized rubber are shown in Table 5.

Comparative Example 1

The air in an autoclave having a capacity of 15 liters which is provided with an electromagnetic stirrer is fully replaced by nitrogen gas, and an evacuation-N$_2$ filling cycle is repeated 3 times, followed by reducing the pressure to a level as low as possible. Subsequently, the autoclave is charged with 7500 g of degassed purified water, 15 g of ammonium persulfate and, as an emulsifier, 22.5 g of ammonium perfluorooctanoic acid, and maintained at 85° C. Then, there is charged a monomer mixture consisting of 34.9% by weight of VdF, 44.9% by weight of HFP and 20.2% by weight of TFE until a pressure of 8 kg/cm$^2$-G is attained. As the polymerization proceeded, the pressure decreased to 7 kg/cm$^2$-G. Then, there is added an additional monomer mixture consisting of 45.1% by weight of VdF, 31.4% by weight of HFP and 23.5% by weight of TFE, thereby to bring the pressure back to 8 kg/cm$^2$-G. Repeating this operation, the polymerization reaction is performed for 1.5 hour and, then, the remaining monomer mixture is discharged to terminate the polymerization.

To the obtained emulsion is added a magnesium chloride solution to salt out the polymer. The polymer is thoroughly washed with water and, then, subjected to vacuum drying at 100° C. to obtain about 1.5 kg of a fluorine-containing elastomer. The $^{19}$FNMR measurement showed that the fluorine-containing elastomer consisted of 46.7% by weight of VdF units, 34.0% by weight of HFP units and 19.3% by weight of TFE units. [$\eta$] was 106, $\overline{M}n$ is 10.3×10$^4$, $\overline{M}w/\overline{M}n$ is 10.5, M$_5$ is 9.5%, and M$_{100}$ is 27.4%.

This fluorine-containing elastomer is subjected to polyol vulcanization under the standard conditions. The Mooney viscosity of the vulcanizate is 91. The properties of the vulcanized rubber are shown in Table 6.

TABLE 6

| Hardness (JIS-A) | Tensile stress at 100% elongation (kgf/cm$^2$) | Tensile strength (kgf/cm$^2$) | Elongation (%) | Compression set (%) |
|---|---|---|---|---|
| 83 | 66 | 169 | 244 | 44 |

Example 7

Heat-fixing roll

Using the fluorine-containing elastomer polymerized in Example 2, a composition is prepared according to the following formulation.

| Components | (parts by weight) |
|---|---|
| Fluorine-containing elastomer | 100 |
| Medium thermal carbon | 10 |
| Calcium hydroxide | 4 |
| Lead oxide | 10 |
| Bisphenol AF | 2 |
| benzyltriphenyphosphonium chloride | 0.6 |

The composition thus prepared is kneaded well and formed into a thin sheet using a 6-inch mixing roll. This sheet is subjected to press molding at 177° C. using an electric heat press to produce a sample having a size of 200 mm×100 mm×0.5 mm (thickness), followed by oven vulcanization at 232° C. for 24 hours. This sample is rolled up around the upper roll of a laminator (manufactured by Mitsubishi Corporation, Japan) and the temperature of the sample surface is raised to 180° C. Subsequently, a toner image is fixed by applying liquid polyorganosiloxane having mercapto groups as functional groups onto the surface of the sample. No offset occurred.

Further, the fluororubber is subjected to Taber abrasion measurement substantially in accordance with ASTM D1044-56 to find that the volume loss is 170 mg/1000 revolutions.

Currently in the field of a fixing roll, a fluororesin, silicone rubber or the like is used as a material but each of these materials has problems with respect to toner-fixing ability, durability, etc. However, by using the fluorine-containing elastomer of the present invention, a fixing roll having an excellent fixing ability and an excellent durability is obtained.

Example 8

Control valve

Into the fluorine-containing elastomer obtained in Example 1 are incorporated 2.0 phr of bisphenol AF, 0.6 phr of benzyltriphenyphosphonium chloride, 30 phr of medium thermal (MT) carbon black, 6 phr of calcium hydroxide and 3 phr of highly activated magnesium oxide, and then vulcanization molded to obtain a rubber sheet. With respect to the obtained rubber sheet, a surface adhesion is measured as described below.

A rubber sheet [2.0 mm(thickness)×35 mm×35 mm] is attached onto the upper surface of a flat stand using a heat resistant double side adhesive tape and thereon is placed a half-steel (JIS S-45C) ring having a flat bottom which ring is provided with a weight-receiving portion and a hanging means so that the flat bottom contacted the rubber sheet (the ring is 25 mm in outer diameter and 19 mm in inner diameter, and the flat bottom thereof in contact with the rubber sheet has previously been abraded with #1000 abrasive paper). Subsequently, a weight is placed on the weight-receiving portion of the ring so that the total load on the rubber sheet became 609 g/cm$^2$. The whole was heated in an oven at 120° C. for 20 hours, and then taken out and allowed to stand to cool for about 4 hours. When the temperature descended to 23° C., the weight is removed. Then, the ring adhering to the rubber sheet is connected, by the hanging means, to a tensile machine having a load cell, and pulled at a pulling rate of 50 mm/min to measure the adhesion strength. The result is shown in Table 7.

In various kinds of valves used in automobiles etc., adhesion often occurs between a vulcanized rubber and an adjacent metal part at the contact point thereof, which leads to a serious problem endangering human life. To obviate the abovementioned problem, a method has been developed for imparting an anti-adhesive property to the surface of a vulcanized rubber. In such a conventional method, rubber materials are imparted with an antiadhesive property by incorporating thereinto an additive such as talc, zeolite, graphite, Teflon or the like. Further, there have been proposed another method in which only the surface portion of a rubber material is chemically or physically treated to impart anti-adhesiveness thereto. However, each of these methods has a drawback, that is, the former impairs the essential properties of a rubber material and the latter sometimes brings about safety and health problems in addition to problems about durability and reliability. By using the fluorine-containing elastomer of the present invention having a specific structure, the problems inevitably accompanying the conventional methods can be completely solved.

Example 9

With respect to the polymer obtained in Example 5, adhesion is measured in the same manner as in Example 8. The result is shown in Table 7.

Comparative Examples 2 and 3

Using Viton E-60 and Viton B which are fluorine-containing elastomers produced by I.E. du Pon de Nemours and Company, adhesion is measured in the same manner as in Example 8. The results are shown in Table 7.

TABLE 7

|  | To half steel (S-45C) with its surface abraded with #1000 abrasive paper | |
|---|---|---|
|  | adhesion (kgf) | adhesion (kg/cm$^2$) |
| Example 8 | 20.0 | 9.7 |
| Example 9 | 21.5 | 10.4 |
| Comparative Example 2 | 28.7 | 13.8 |
| Comparative Example 3 | 34.5 | 16.7 |

Example 10

Shaped packings such as O-ring, V-packing, U-packing, Y-packing, D-ring, triangular ring, T-ring and X-ring Using the vulcanized composition obtained in Example 1, the following test is conducted. With respect to a compression set resistance, an O-ring (inner diameter 23.7 mm, thickness 3.5 mm) is compressed so that the thickness decreased by 25%, and put in an oven and heated at 200° C. for 1700 hours, followed by measurement according to JIS K6301. An abrasion resistance is examined by a Taber abrasion test substantially in accordance with ASTM D1044-56. The Taber abrasion test is conducted using a truck wheel H-22 under such conditions that the total number of revolution is 1000 and a load of 1 kg is applied. The results are shown in Table 8.

Beside a compression set resistance, the shaped packings are required to have an abrasion resistance when they are used to seal a moving part. However, the conventional fluorine-containing elastomers which are used in the fields requiring resistances to heat, an oil, a solvent or chemicals have not necessarily sufficient compression set resistance and abrasion resistance. In contrast, the vulcanized composition containing the fluorine-containing elastomer of the present invention has a largely improved compression set resistance and abrasion resistance.

Example 11

Using the vulcanized composition obtained in Example 2, the same tests as in Example 10 are conducted. The results are shown in Table 8.

Example 12

Using the vulcanized composition obtained in Example 5, the same tests as in Example 10 are conducted. The results are shown in Table 8.

Comparative Example 4

Using a vulcanized composition produced in substantially the same manner as in Example 1 except that Viton E-60 manufactured by E.I. du Pont de Nemours and Company was used in place of the fluorine-containing elastomer of Example 1 and that press vulcanization is effected for 20 min, the same tests as in Example 10 are conducted. The results are shown in Table 8.

TABLE 8

|  | Example 10 | Example 11 | Example 12 | Comparative Example 4 |
|---|---|---|---|---|
| Compression set (%) | 63 | 65 | 59 | 80 |
| Wear (mg) | 265 | 340 | 280 | 400 |

Example 13

Oil seals

Using the vulcanized composition obtained in Example 1, the following test is conducted. With respect to a compression set resistance, an O-ring (inner diameter 23.7 mm, thickness 3.5 mm) is compressed so that the thickness decreased by 25%, and put in an oven and heated at 200° C. for 1700 hours, followed by measurement according to JIS K6301. An abrasion resistance is examined by Taber abrasion test substantially in accordance with ASTM D1044-56. The Taber abrasion test is conducted using a truck wheel H-22 under such conditions that the total number of revolution is 1000 and a load of 1 kg is applied. The results are shown in Table 9.

Beside a compression set resistance, oil seals are required to have an abrasion resistance when they are used to seal a moving part. However, the cconventional fluorine-containing elastomers which are used in the fields requiring resistances to heat, an oil, a solvent or chemicals have not necessarily sufficient compression set resistance and abrasion resistance. In contrast, the vulcanized composition containing the fluorine-containing elastomer of the present invention has a largely improved compression set resistance and abrasion resistance.

Example 14

Using the vulcanized composition obtained in Example 2, the same tests as in Example 13 are conducted. The results are shown in Table 9.

Example 15

Using the vulcanized composition obtained in Example 5, the same tests as in Example 13 are conducted. The results are shown in Table 9.

Comparative Example 5

Using a vulcanized composition produced in substantially the same manner as in Example 1 except that Viton E-60 manufactured by E.I. du Pont de Nemours and Company is used in place of the fluorine-containing elastomer of Example 1 and that press vulcanization is effected for 20 min, the same tests as in Example 13 are conducted. The results are shown in Table 9.

TABLE 9

|  | Example 13 | Example 14 | Example 15 | Comparative Example 5 |
|---|---|---|---|---|
| Compression set (%) | 63 | 65 | 59 | 80 |
| Wear (mg) | 265 | 340 | 280 | 400 |

Example 16

Diaphragm

Using the vulcanized composition obtained in Example 1, a flex cracking test is conducted at 25° C., and the number of flexings at crack is measured using a de Mattia machine according to JIS K6301. The result is shown in Table 10.

Diaphragms are manufactured from an elastomer alone or a composite material containing elastomer and a cloth, and in either case a flex cracking resistance is required. However, the conventional fluorine-containing elastomers which are used in the fields requiring resistances to heat, an oil, a solvent or chemicals have not necessarily sufficient flexing resistance. In contrast, the vulcanized composition containing the fluorine-containing elastomer of the present invention has a largely improved flex cracking resistance.

Example 17

Using the vulcanized composition obtained in Example 2, the same test as in Example 16 is conducted, the result is shown in Table 10.

Example 18

Using the vulcanized composition obtained in Example 5, the same test as in Example 16 is conducted. The result is shown in Table 10.

Comparative Example 6

Using a vulcanized composition produced in substantially the same manner as in Example 1 except that Viton E-60 manufactured by E. I. du Pont de Nemours and Company is used in place of the fluorine-containing elastomer of Example 1 and that press vulcanization is effected for 20 min, the same test as in Example 16 is conducted. The result is shown in Table 10.

TABLE 10

|  | Number of flexings to crack initiation |
|---|---|
| Example 16 | 4000 |
| Example 17 | more than 50000 |
| Example 18 | 6000 |
| Comparative Example 6 | 800 |

Example 19

Gasket

Using the vulcanized composition obtained in Example 1, a compression set resistance test is conducted as follows. An O-ring (inner diameter 23.7 mm, thickness 3.5 mm) is compressed so that the thickness decreases by 25%, and put in an oven and heated at 200° C. for 1700 hours, followed by measurement according to JIS K6301. The result is shown in Table 11.

Gaskets are required to have a compression set resistance. However, the conventional fluorine-containing elastomers which are used in the fields requiring resistances to heat, an oil, a solvent or chemicals have not necessarily sufficient long-term compression set resistance. In contrast, the vulcanized composition containing the fluorine-containing elastomer of the present invention has a largely improved long-term compression set resistance.

Example 20

Using the vulcanized composition obtained in Example 2, the same test as in Example 19 is conducted. The result is shown in Table 11.

Example 21

Using the vulcanized composition obtained in Example 5, the same test as in Example 19 is conducted. The result is shown in Table 11.

Comparative Example 7

Using a vulcanized composition produced in substantially the same manner as in Example 1 except that Viton E-60 produced by E.I. du Pont de Nemours and Company is used in place of the fluorine-containing elastomer of Example 1 and that press vulcanization is effected for 20 min, the same test as in Example 18 is conducted. The result is shown in Table 11.

TABLE 11

|  | Example 19 | Example 20 | Example 21 | Comparative Example 7 |
|---|---|---|---|---|
| Compression set (%) | 63 | 65 | 59 | 80 |

Example 22

Rubber valve seat type butterfly valve

Using the vulcanized composition obtained in Example 1, the following test is conducted. With respect to a compression set resistance, an O-ring (inner diameter 23.7 mm, thickness 3.5 mm) is compressed so that the thickness decreased by 25% and put in an oven and heated at 200° C. for 1700 hours, followed by measurement according to JIS K6301. An abrasion resistance is examined by a Taber abrasion test substantially in accordance with ASTM D1044-56. The Taber abrasion test is conducted using a truck wheel H-22 under such conditions that the total number of revolution is 1000 and a load of 1 kg is applied. The results are shown in Table 12.

The rubber valve seat of an enclosed butterfly valve is required to have a compression set resistance and abrasion resistance. However, the conventional fluorine-containing elastomers which are used in the fields requiring resistances to heat, oil, solvents and chemicals do not necessarily have sufficient compression set resistance and abrasion resistance. In contrast, the vulcanized composition containing the fluorine-containing elastomer of the present invention has a significantly improved compression set resistance and abrasion resistance.

Example 23

Using the vulcanized composition obtained in Example 2, the same tests as in Example 22 are conducted. The results are shown in Table 12.

Example 24

Using the vulcanized composition obtained in Example 5, the same tests as in Example 22 are conducted. the results are shown in Table 12.

Comparative Example 8

Using the vllcanized composition produced in substantially the same manner as in Example 1 except that Viton E-60 produced by E.I. du Pont de Nemours and company is used in place of the fluorine-containing elastomer of Example 1 and that press vulcanization is effected for 20 min, the same tests as in Example 22 are conducted. The results are shown in Table 12.

TABLE 12

|  | Example 22 | Example 23 | Example 24 | Comparative Example 8 |
|---|---|---|---|---|
| Compression set (%) | 63 | 65 | 59 | 80 |
| Wear (mg) | 265 | 340 | 280 | 400 |

Example 25

Stem valve

Using the vulcanized composition obtained in Example 1, the following test is conducted. With respect to a compression set resistance, an O-ring (inner diameter 23.7 mm, thickness 3.5 mm) is compressed so that the thickness decreased by 25%, and put in an oven and heated at 200° C. for 1700 hours, followed by measurement according to JIS K6301. An abrasion resistance is examined by a Taber abrasion test substantially in accordance with ASTM D1044-56. The Taber abrasion test is conducted using a truck wheel H-22 under such conditions that the total number of revolution is 1000 and a load of 1 kg is applied. The results are shown in Table 13.

A stem valve is required to have a compression set resistance and abrasion resistance. However, the conventional fluorine-containing elastomers which are used in the fields requiring resistances to heat, oil, solvents or chemicals do not necessarily have sufficient compression set resistance and abrasion resistance. In contrast, the vulcanized composition containing the fluorine-containing elastomer of the present invention has a significantly improved compression set resistance and abrasion resistance.

Example 26

Using the vulcanized composition obtained in Example 2, the same tests as in Example 25 are conducted. The results are shown in Table 13.

Example 27

Using the vulcanized composition obtained in Example 5, the same tests as in Example 24 are conducted. The results are shown in Table 13.

Comparative Example 9

Using the vulcanized composition produced in substantially the same manner as in Example 1 except that Viton E-60 produced by E.I. du Pont de Nemours and company is used in place of the fluorine-containing elastomer of Example 1 and that press vulcanization is effected for 20 min, the same tests as in Example 25 are conducted. The results are shown in Table 13.

TABLE 13

|  | Example 25 | Example 26 | Example 27 | Comparative Example 9 |
|---|---|---|---|---|
| Compression set (%) | 63 | 65 | 59 | 80 |
| Wear (mg) | 265 | 340 | 280 | 400 |

Example 28

Shaped article for use with SF class engine oil

Using the vulcanized composition obtained in Example 2, the following tests are conducted. An immersion test is conducted substantially in accordance with JIS K6301, in which test a test sample is immersed in Honda Genuine Ultra Motor Oil SF at 150° C. for 500 hours. With respect to compression set resistance, an O-ring (inner diameter 23.7 mm, thickness 3.5 mm) is compressed so that the thickness decreases by 25% and immersed in Honda Genuine Ultra Motor Oil at 150° C. for 500 hours, followed by measurement according to JIS K6301. The results are shown in Table 14.

In recent years, in accordance with the trend that automobiles are becoming fuel-saving and maintenance-free, engine oils have been shifting from the SD and SE classes to the SF class. In using an SF class engine oil, the contents of additivss such as a detergent-dispersant and wear resistant agent are increased and/or the types of additives have been changed, and are not the same as those used in conventional engine oils.

Due to the above mentioned changes in the additives of SF class engine oils, the properties of conventional polyol-vulcanized fluorine-containing elastomer compositions are largely deteriorated under the attack of these engine oil additives. A polymine-vulcanized fluorine-containing elastomer composition is resistant to engine oil additives as compared with a polyol-vulcanized fluorine-containing elastomer composition but is extremely inferior to the polyol-vulcanized composition in compression set resistance. On the other hand, a peroxide-vulcanized fluorine-containing elastomer composition is excellent in resistance to an SF class engine oil, but is not only inferior to a polyol-vulcanized composition in compression set resistance, but also has problems in workability, such as having an adhesion problem with the great amount of burr formed in a metal mold in press molding and having difficulties in bonding with a metallic material.

The polyol-vulcanized composition containing the fluorine-containing elastomer of the present invention is excellent in compression set resistance and also in maintaining its properties even in an SF class engine oil and, therefore, is suitable for use as shaped packings which may contact with an SF class engine oil, such as O-ring, V-packing, U-packing, Y-packing, D-ring, triangular ring, T-ring and X-ring, and for use as an oil seal, diaphragm, gasket, rubber valve seat type butterfly valve and stem valve.

Comparative Example 10

Using a composition produced in substantially the same manner as in Example 1 except that Dai-el G-901 produced by Daikin Industries, Ltd., Japan is used in place of the fluorine-containing elastomer of Example 1 and that 1.5 parts by weight of Perhexa 2.5B (produced by NIPPON OIL & FATS CO., LTD.) and 4 parts by weight of triallylisocyanurate are used in place of calcium hydroxide, highly activated magnesium oxide, bisphenol AF and bis(benzyldiphenylphosphine)iminium chloride, press vulcanization is effected at 160° C. for 10 min and then vulcanization is effected in an oven at 180° C. for 4 hours to complete a peroxide-vulcanization. The the same tests as in Example 28 are conducted. The results are shown in Table 14.

TABLE 14

|  | Example 28 | Comparative Example 10 |
|---|---|---|
| Compression set (%) | 43 | 56 |
| Change in Tensile strength (%) | −17 | −37 |

TABLE 14-continued

|  | Example 28 | Comparative Example 10 |
| --- | --- | --- |
| Change in elongation (%) | −10 | −24 |

Probability of Utilization in Industry

The fluorine-containing elastomer of the present invention is excellent in resistances to heat and chemicals and is not only extremely excellent in compression set resistant properties and mechanical properties but also has a workability superior to or comparable with conventional fluorine-containing elastomers. Moreover, by vulcanization of the fluorine-containing elastomer by means of a vulcan izing agent such as a polyamine compound or a polyol compound, there can be obtained excellent elastic shaped articles such as heat-fixing rolls, valves, rings, seals, packings, gaskets and the like.

What is claimed is:

1. A shaped article which is produced by vulcanizing a mixture of a polyol compound and a fluorine-containing elastomer comprising vinylidene fluoride units, hexafluoropropylene units, and optionally tetrafluoroethylene units, and wherein:
    (a) the fluorine content of the elastomer is 63.5 to 71% by weight,
    (b) the limiting viscosity number (ml/g) of the elastomer is in the range of from 100 to less than 250,
    (c) the content of fractions having molecular weights of 50,000 or less in the elastomer is 5% by weight or less, and
    (d) the content of fractions having molecular weights of 1,000,000 or more in the elastomer is 10 to 35% by weight.

2. The shaped article according to claim 1, which is a heat-fixing roll, a control valve, or a shaped packing selected from the group consisting of an O-ring, V-packing, U-packing, Y-packing, D-ring, triangular ring, T-ring and X-ring, a gasket, a rubber valve seat type butterfly valve, a stem valve, an oil seal, a shaped article for use with SF class engine oil, a fuel hose, heat-shrinkable tubing, a wet friction material, wire coating, a piezoelectric material or bellows for smoke duct joint.

3. A diaphragm which is produced by vulcanizing a mixture of a polyamine compound or a polyol compound and a fluorine-containing elastomer comprising vinylildene fluoride units, a hexafluoropropylene units, and optionally with tetrafluoroethylene units, and wherein:
    (a) the fluorine content of the elastomer is 63.5 to 71% by weight,
    (b) the limiting viscosity number (ml/g) of the elastomer is in the range of from 100 to less than 250,
    (c) the content of fractions having molecular weights of 50,000 or less in the elastomer is 5% by weight or less, and
    (d) the content of fractions having molecular weights of 1,000,000 or more in the elastomer is 10 to 35% by weight.

4. A fluorine-containing elastomer comprising vinylidene fluoride units hexafluoropropylene units and 35 and 0% by weight, based on the weight of the elastomer, of tetrafluoroethylene units, the total of said vinylidene fluoride units and said hexafluoropropylene units being 65 to 100% by weight based on the weight of the elastomer, the weight ratio of said vinylidene fluoride units to said hexafluoropropylene units being in the range of 80:20 to 40:60, and wherein:
    (a) the fluorine content of the elastomer is 63.5 to 71% by weight,
    (b) the limiting viscosity number (ml/g) of the elastomer is in the range of from 100 to less than 250,
    (c) the content of fractions having molecular weights of 50,000 or less in the elastomer is 5% by weight or less, and
    (d) the content of fractions having molecular weights of 1,000,00 or more in the elastomer is 10 to 35% by weight.

5. The fluorine-containing elastomer according to claim 4, wherein said limiting viscosity number (ml/g) is in the range of from 120 to less than 250.

6. An extruded product of a fluorine-containing elastomer as desciibed in claim 4, in which the limiting viscosity number is 10 to 100 larger than those in the range of from 100 to less than 250, said fluorine-containing elastomer having been subjected to extrusion using a heated extruder, to form the extruded product.

7. The fluorine-containing elastomer according to claim 4, wherein the weight ratio of said vinylidene fluoride units to said hexafluoropropylene units is in the range of 75:25 to 40:60.

8. The fluorine-containing elastomer according to claim 4, wherein the total of said vinylidene fluoride units and said hexafluoropropylene units is 65 to 95% by weight based on the weight of the elastomer, the content of said tetrafluoroethylene units in the elastomer is 35 to 5% by weight, and the weight ratio of said vinylidene fluoride units to said hexafluoropropylene units is in the range of 80:20 to 50:50.

9. The fluorine-containing elastomer according to claims 7, or 4, wherein said limiting viscosity number (ml/g) is in the range of from 100 to less than 160 and the content of fractions having molecular weight of 1,000,000 or more in the elastomer is 10 to less than 20% by weight.

10. The fluorine-containing elastomer according to claims 7, or 8, wherein said limiting viscosity number (ml/g) is in the range of from 160 to less than 220 and the content of fractions having molecular weight of 1,000,000 or more in the elastomer is 20 to 30% by weight.

11. The fluorine-containing elastomer according to claims 7 or 8, wherein said limiting viscosity number (ml/g) of the elastomer is in the range of from 220 to less than 250 and the content of fractions having molecular weight of 1,000,000 or more in the elastomer is 30 to 35% by weight.

12. The fluorine-containing elastomer according to claim 9, wherein the total of said vinylidene fluoride units and said hexafluoropropylene units is 75 to 95% by weight based on the weight of the elastomer, the content of said tetrafluoroethylene units in the elastomer is 25 to 5% by weight, and the weight ratio of said vinylidenefluoride units to said hexafluoropropylene units is in the range of 60:40 to 50:50.

13. The fluorine-containing elastomer according to claim 10, wherein the total of said vinylidene fluoride units and said hexafluoropropylene units is 75 to 95% by weight based on the weight of the elastomer, the content of said tetrafluoroethylene units in the elastomer is 25 to 5% by weight, and the weight ratio of said vinylidenefluoride units to said hexafluoropropylene units is in the range of 70:30 to 60:40.

14. The fluorine-containing elastomer according to claim 11, wherein the total of said vinylidene fluoride units and said hexafluoropropylene units is 75 to 95% by weight based on the weight of the elastomer, the content of said tetrafluoroethylene units in the elastomer is 25 to 5% by weight, and the weight ratio of said vinylidenefluoride units to said hexafluoropropylene units is in the range of 80:20 to 70:30.

* * * * *

UNITED STATES PATENT AND TRADEMARK OFFICE
CERTIFICATE OF CORRECTION

PATENT NO. : 4,830,920
DATED : May 16, 1989
INVENTOR(S) : Kenichi Hayashi et al.

It is certified that error appears in the above-identified patent and that said Letters Patent is hereby corrected as shown below:

On the Title page of the patent, Column 1, change "[22] Filed: August 17, 1987" to -- [22] PCT Filed: May 8, 1987

[86] PCT No.: PCT/JP87/00285

§ 371 Date: August 17, 1987

§ 102(e) Date: August 17, 1987

[87] PCT Pub. No. : WO 88/08857

PCT Pub. Date: November 17, 1988 --

Signed and Sealed this

First Day of August, 1995

*Attest:*

BRUCE LEHMAN

*Attesting Officer*     *Commissioner of Patents and Trademarks*